United States Patent
Gheorghe et al.

(10) Patent No.: US 10,209,162 B2
(45) Date of Patent: Feb. 19, 2019

(54) METHOD AND DEVICE FOR DETECTING A FAILURE ON AN AIRCRAFT

(71) Applicants: AIRBUS OPERATIONS (SAS), Toulouse (FR); INSTITUT POLYTECHNIQUE DE BORDEAUX, Pessac (FR); CENTRE NATIONAL DE LA RECHERCHE SCIENTIFIQUE (CNRS), Paris (FR); UNIVERSITE DE BORDEAUX, Bordeaux (FR)

(72) Inventors: Anca Gheorghe, Toulouse (FR); Philippe Goupil, Beaupuy (FR); Rémy Dayre, Pibrac (FR); Ali Zolghadri, Leognan (FR); Jérôme Cieslak, Talence (FR); Denis Efimov, La Madeleine (FR)

(73) Assignees: Airbus Operations (S.A.S.), Toulouse (FR); Institut Polytechnique De Bordeaux, Pessac (FR); Centre National De La Recherche Scientifique, Paris (FR); Universite De Bordequx, Bourdeaux (FR)

( * ) Notice: Subject to any disclaimer, the term of this patent is extended or adjusted under 35 U.S.C. 154(b) by 1046 days.

(21) Appl. No.: 14/306,655

(22) Filed: Jun. 17, 2014

(65) Prior Publication Data
US 2014/0372078 A1    Dec. 18, 2014

(30) Foreign Application Priority Data
Jun. 17, 2013   (FR) .................................. 13 55665

(51) Int. Cl.
G01M 17/00 (2006.01)
G05B 23/02 (2006.01)
B64C 13/50 (2006.01)

(52) U.S. Cl.
CPC ............. G01M 17/00 (2013.01); B64C 13/50 (2013.01); G05B 23/0221 (2013.01)

(58) Field of Classification Search
None
See application file for complete search history.

(56) References Cited

U.S. PATENT DOCUMENTS 4,337,516 A * 6/1982 Murphy ................. G01D 18/00
701/116
4,904,999 A * 2/1990 Klansnic ................. G05B 9/02
244/194

(Continued)

FOREIGN PATENT DOCUMENTS

FR    2 936 067    3/2010

OTHER PUBLICATIONS

Search Report for FR 1355665, dated Mar. 10, 2014.

(Continued)

*Primary Examiner* — Aditya Bhat
(74) *Attorney, Agent, or Firm* — Nixon & Vanderhye P.C.

(57) ABSTRACT

The detecting means (1) comprise measuring means (2) adapted to measure and provide at least one raw data corresponding to an aircraft parameter, computing means (3) adapted to estimate at least one derivative of said raw data, and detecting means (4) adapted to detect a failure with the aid of said derivative, said computing means (3) being adapted to estimate said derivative by differentiation.

12 Claims, 1 Drawing Sheet

(56) References Cited

Figure 1:
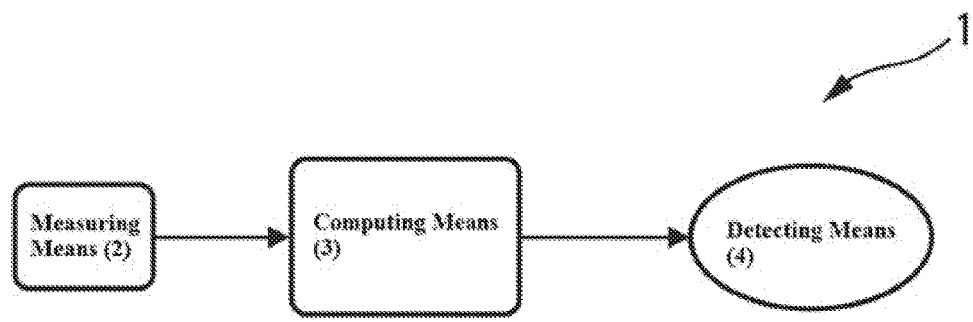

U.S. PATENT DOCUMENTS 8,682,507 B2 * 3/2014 Ezerzere ............... G05B 13/04
340/965
2011/0196820 A1 8/2011 Yuan

OTHER PUBLICATIONS

Efimov et al., "Actuator fault detection in aircraft systems: Oscillatory failure case study", *Annual Reviews in Control,* vol. 37, No. 1, Apr. 1, 2013, pp. 180-190.
Chawda et al., "Application of Levant's differentiator for velocity estimation and increased Z-width in haptic interfaces", Jun. 21, 2011, pp. 403-408.
Iqbal et al., "Fault diagnosis of nonlinear systems using higher order sliding mode technique", *Asian Control Conference 2009,* Aug. 27, 2009, pp. 875-880.

* cited by examiner

METHOD AND DEVICE FOR DETECTING A FAILURE ON AN AIRCRAFT

This application claims priority to FR 1355665 filed Jun. 17, 2013, the entire content of which is hereby incorporated by reference.

The present invention relates to a method and to a device for detecting a fault on an aircraft. The technical field relates in particular to that of electrical flight control systems for aircraft.

Monitoring the performance of an aircraft or of one of its systems is possible through monitoring at least one measured parameter or at least one defect-indicating signal constructed on the basis of the parameters measured on an aircraft, said monitoring being performed by means of the detection of a defect, such as a malfunction or an abnormal signal.

Monitoring of a parameter can be performed on the derivative of a signal resulting from the measurement of the parameter or of a defect-indicating signal, in particular while estimating the derivative. There are, for example, filtered derivators which use the Euler-rectangle method to estimate the derivative $\dot{y}(k)$ of a signal $y(k)$ using the following formula:

$$\dot{y}(k) = \frac{y(k) - y(k-1)}{\Delta t},$$

where k is the discrete time and $\Delta t$ is the sampling period.

This technique makes it possible to approach the derivative of a signal in the absence of noise. However, in practice, this estimator is rarely usable in noisy surroundings since it leads to an amplification of the measurement noise. Indeed, the finite difference aims to find the derivative of the noiseless signal $\dot{y}_0(k)$ with knowledge of only the noisy signal $y(k)=y_0(k)+\varepsilon(k)$, and this is impossible without a priori knowledge of the characteristics of the noise affecting the signal. The method therefore creates no distinction between useful information $y_0(k)$ and interference $\varepsilon(k)$, and this explains the deterioration in the obtained derivative, which becomes greater the shorter the sampling period.

If information on the characteristics of the noise is available, with, for example, separation of the spectra of the useful signal and of the noise, it is possible to place a filter upstream of this derivator, so as to attenuate the effect of the noise $\varepsilon(k)$, for example a low-pass filter, if the useful signal is among the low frequencies whereas the noise occupies the entire frequential horizon. This operation makes it possible to obtain an estimate of the usable derivative, albeit with a delay caused by the filter, which is longer the more efficient the filter. This delay can be inopportune in crucial real-time applications, for example for detecting malfunctioning, since no decision can be taken all the while that the transient mode of the filter is not fully switched off. In addition, when it is necessary to estimate successive derivatives of the same signal, an additional delay is caused by the wait for the outcome of the estimate of the low order derivative, and the residual noise is amplified.

Another approach sets out the derivation issue in terms of observer or estimator. The measured signal, of which we want to estimate the derivative, is modelled as the output of a chain of integrators of which the input is a signal having known characteristics. However, the observer of a chain of pure integrators (where the second state is the derivative of the first state, the third state is the derivative of the second state, the $n^{th}$ state is the derivative of the $(n-1)^{th}$ state), is nothing but a derivator. The derivation algorithm is therefore an observer for estimating the inputs and outputs of each integrator.

In a stochastic framework, the solution that is very often used is Kalman filtering. The Kalman filter uses a model of the useful signal. The structure and parameters of this model can be identified by a projection algorithm (the family of subspace methods), or by a more traditional approach based on minimising a cost criterion. The stochastic portion of the signal is managed by means of variance/covariance matrices of the state and measurement noise, which can be used as adjustment parameters. These parameters are nonetheless tricky to adjust and a new adjustment is to be found if there is a change of support to be derived.

Furthermore, the recently introduced algebraic derivators have interesting theoretical aspects, but their practical use requires the signal to be derived to be reset to zero during operation, and this is incompatible with the envisaged applications.

The object of the present invention is to circumvent the aforesaid problems. It relates to a detection method which can be applied to any type of aircraft with electrical flight controls, in order to detect an abnormal parameter.

According to the invention, said detection method is distinctive in that it comprises the following successive steps, which are implemented in an automated and repeated manner, and consist in:
  a) receiving at least one datum depending on a parameter measured by a sensor, said datum being noisy,
  b) estimating a derivative of said noisy datum by differentiation, on the basis of said noisy datum; and
  c) detecting a fault on the basis of at least this estimated derivative.

Thus, the device outlined makes it possible to detect some defects which are reflected in a change in the properties of some signals, and which can be detected by computing derivatives, without detriment to the weight and cost of the aircraft since there are no additional sensors.

Furthermore, the device requires no knowledge of a model of the system being monitored, nor does it require knowledge of the noise on the sensor, particularly knowledge of the spectrum of the noise.

According to various embodiments of the invention, which can be taken in combination or in isolation:
  since said noisy datum is in the form $y(k)=y_0(k)+\varepsilon(k)$, where $y_0(k)$ is the useful datum and $\varepsilon(k)$ the noise at the time k, and the derivative of rank n of said useful datum $y_0(k)$ verifies a Lipschitz-type smoothing condition: $|y_0^{(n)}(k)-y_0^{(n)}(k-1)| \leq L\Delta t$, where L is a constant, said method consists in filtering the noise by eliminating the components of said noisy datum $y(k)$ of which the rate of variation in the derivative of rank n is greater than L;
  in step b), a Levant differentiator of order n makes it possible to estimate said noisy datum and its derivatives, said differentiator being in the form:

$$\begin{cases} \dot{z}_0 = -\alpha_0|z_0 - y|^{n/(n+1)}\mathrm{sign}(z_0 - y) + z_1 \\ \dot{z}_1 = -\alpha_1|z_1 - \dot{z}_0|^{(n-1)/n}\mathrm{sign}(z_1 - \dot{z}_0) + z_2 \\ \ldots \\ \dot{z}_i = -\alpha_i|z_i - \dot{z}_{i-1}|^{(n-i)/(n-i+1)}\mathrm{sign}(z_i - \dot{z}_{i-1}) + z_{i+1} \\ \ldots \\ \dot{z}_n = -\alpha_n\mathrm{sign}(z_n - \dot{z}_{n-1}) \end{cases}$$

where $z_0, z_1 \ldots z_n$ represent the estimate of the signal and of its n successive derivatives respectively, and the coefficients $\alpha_i$ are positive gains representing adjustment parameters (which are deduced on the basis of the value of L);

said method consists in using, in step b), a Levant differentiator of order 1, the differentiator having the following form:

$$\begin{cases} \dot{z}_0 = -\alpha_0|z_0 - y|^{1/2}\text{sign}(z_0 - y) + z_1 \\ \dot{z}_1 = -\alpha_1 \text{sign}(z_1 - \dot{z}_0) = -\alpha_1 \text{sign}(z_0 - y) \end{cases}$$

With, for example in a particular embodiment,
$\alpha_0 = 1.5\ L^{1/2}$ and $\alpha_1 = 1.1\ L$;

in step b), the value of L is selected so as to minimise estimation error $|z_0 - y|$;

in order to detect jamming of an aircraft control surface, in step c), the method consists in comparing the derivatives of two correlated parameters in order to determine said jamming;

a first of said two parameters corresponds to the control of the control surface and the second parameter corresponds to the measurement from a control surface movement sensor;

in order to detect an oscillatory defect in an aircraft control surface, in step c), the method consists in detecting an oscillatory defect by tallying all the successive and alternating instances of said derivative estimated in step b) exceeding a given threshold, and wherein the number resulting from said tally is above a predetermined number;

in step c), the method uses an advanced version of the Levant differentiator of order 1, in which:

$$\begin{cases} \dot{z}_0 = -\alpha|z_0 - y|^{1/2}\text{sign}(z_0 - y) + z_1 \\ \dot{z}_1 = -\beta \text{sign}(z_0 - y) = -\chi \text{sign}(z_1) - z_1 \end{cases}$$

where $\alpha, \beta, \chi$ are adjustment parameters which depend on L;

in order to detect a malfunction on the aircraft, in step c), the method consists in detecting a malfunction when said derivative of a parameter is zero;

in order to detect a malfunction on the aircraft, in step c), the method consists in comparing two data of parameters of consistent evolution, said malfunction being detected when the derivative of one parameter is zero while the derivative of the other parameter is not zero.

The present invention also relates to a device for detecting a fault on an aircraft, comprising:
measuring means adapted to measure and transmit at least one noisy datum corresponding to an aircraft parameter;
computing means adapted to estimate at least one derivative of said noisy datum; and
detecting means adapted to detect a fault on the basis of said derivative.

According to the invention, this detecting device is distinctive in that said computing means are adapted to estimate said derivative by differentiation.

The invention also relates to an aircraft comprising such a device for detecting a fault.

The figures of the accompanying drawings will clearly illustrate how the invention can be carried out. In these figures, identical references denote like elements.

FIG. 1 schematically shows a detecting device according to a particular embodiment of the invention.

Figure 2:
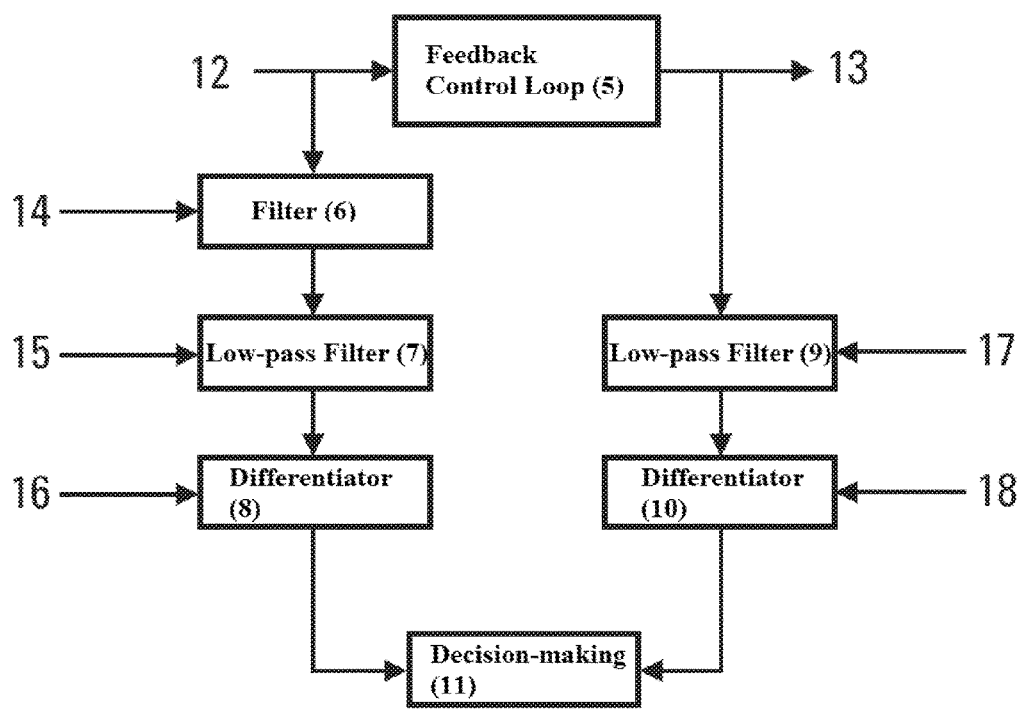

FIG. 2 is a block diagram of the method according to an embodiment of the invention when said embodiment is applied to the jamming of an aircraft control surface.

The device 1 according to the invention, shown in FIG. 1, is designed to detect a fault. It comprises measuring means 2, such as a sensor, which are adapted to measure and transmit at least one noisy datum corresponding to an aircraft parameter. This noisy datum is transmitted to computing means 3 which are adapted to estimate at least one derivative of said datum. The device 1 further comprises detecting means 4 which are adapted to detect a fault on the basis of said estimated derivative.

In order to show some defects owing to the estimation of the derivative of a signal provided by a sensor on board an aircraft, an approach based on the sliding mode technique is applied. Computing the derivative of a signal can lead to detection of malfunctions that may appear on the signal itself.

It is also possible to monitor a second signal, which is supposed to evolve in correlation with the first. The two signals may result from the same command or one may be the command of the other. A malfunction is thus detected following comparison of the two derivatives, with the signals responding differently to the same actuation.

The general operating principle of the sliding modes is to generate a discontinuous control law for bringing in a finite convergence time and maintaining the trajectory of a system (state vector) on a sliding surface where uncertainty and interference are rejected. For sliding mode control of a higher order n, the sliding surface is defined by $s = \dot{s} = \ddot{s} = \ldots = s^{(n-1)} = 0$. On the same basis as the control, the sliding mode observers consist in reconstructing the state while ensuring that the error estimation is zero. The sliding surface is thus defined as the difference between the estimated signal and the actual signal.

Using the higher order sliding mode technique, which is known for its noise resilience, differentiators of order 1 and of a higher order have been defined by Levant. The sliding mode differentiators are sliding mode observers, having a specific structure for the studied system.

Said noisy datum is in the form $y(k) = y_0(k) + \varepsilon(k)$, where $y_0(k)$ is the useful datum and $\varepsilon(k)$ is the limited noise at the time k. It is assumed that the derivative of rank n of said useful datum $y_0(k)$ verifies a Lipschitz-type smoothing condition: $|y_0^{(n)}(k) - y_0^{(n)}(k-1)| \leq L\Delta t$, where L is a constant. The computing means 3 eliminate the components of the noisy datum $y(k)$ of which the rate of variation in the derivative of rank n is greater than L.

In other words, knowing that the rate of variation in the derivative of rank n of the non-noisy signal is limited, the differentiator eliminates every component of the signal of which the derivative of rank n fails to verify a Lipschitz condition; that is to say that it filters the noise in order to approach the actual derivative.

If a suitable selection is made for the Lipschitz constant L, this method is closer to the true derivative of rank n than traditional methods. Moreover, the present invention offers, on the one hand, great resilience with respect to interference and, on the other hand, rapid convergence towards the actual derivative of rank n and limited precision.

The computing means 3 are adapted to use a Levant differentiator of order n, which allows for an estimation of said noisy datum and of its derivatives, said differentiator being in the form:

$$\begin{cases} \dot{z}_0 = -\alpha_0|z_0 - y|^{n/(n+1)}\text{sign}(z_0 - y) + z_1 \\ \dot{z}_1 = -\alpha_1|z_1 - \dot{z}_0|^{(n-1)/n}\text{sign}(z_1 - \dot{z}_0) + z_2 \\ \ldots \\ \dot{z}_i = -\alpha_i|z_i - \dot{z}_{i-1}|^{(n-i)/(n-i+1)}\text{sign}(z_i - \dot{z}_{i-1}) + z_{i+1} \\ \ldots \\ \dot{z}_n = -\alpha_n \text{sign}(z_n - \dot{z}_{n-1}) \end{cases}$$

where $z_0, z_1 \ldots z_n$ represent the estimate of the signal and of its n derivatives respectively, and the coefficients $\alpha_i$ are positive gains representing adjustment parameters. The symbol sign denotes the mathematical function "sign" which extracts the sign (positive, negative or zero) from the outcome of the calculation between parentheses.

In the absence of noises ($\varepsilon(k)=0$), the Levant differentiator provides an accurate estimate in finite time of $y_0, \dot{y}_0 \ldots y_0^{(n)}$.

In the presence of limited measurement noises, convergence in finite time is ensured and the estimation error is revised upwards by a quantity determined by the maximum amplitude of the noise $\varepsilon$:

$$|z_i - y_0^{(i)}| \leq \mu_i L^{\frac{i}{n+1}} \varepsilon^{\frac{n+1-i}{n+1}} = acc_i,$$

where $\mu_i \geq 1$ depends solely on the $\alpha_i$. This means that each derivative $z_i$ of order i which is estimated by means of the differentiator is limited by $z_i \in [y_0^{(i)}-acc_i, y_0^{(i)}+acc_i]$.

The adjustment parameters $\alpha_i$ of the differentiator depend on the Lipschitz constant L, as follows:

$$\alpha_i = \alpha_{i0} L^{\frac{1}{n-i+1}}, \text{ for } i = 0, \ldots, n-1$$

For a differentiator of an order that is less than or equal to 5 (n=5), Levant proposes the adjustment:

$$\alpha_{n0}=1.1, \alpha_{(n-1)0}=1.5, \alpha_{(n-2)0}=3, \alpha_{(n-3)0}=5, \alpha_{(n-4)0}=8, \alpha_{(n-5)0}=12$$

Thus, the device outlined makes it possible to detect some defects which are reflected in a change in the properties of some signals and which can be detected by computing derivatives, without detriment to weight and cost, since there are no additional sensors.

Furthermore, the device requires no knowledge of a model of the monitored system, nor does it require knowledge of the noise on the sensor, particularly knowledge of the spectrum of the noise.

In a preferred embodiment, the computing means 3 are adapted to use a Levant differentiator of order 1 to estimate the $1^{st}$ derivative (that is to say, of rank 1) of a signal resulting from the measurement of an aircraft parameter provided by the measuring means 2. The Levant differentiator of order 1 is based on the sliding mode technique of order 2. As in the general case of order n, the differentiator of order 1 estimates the derivative of a noisy signal y (of limited noise $\varepsilon$) on the assumption that the $1^{st}$ derivative of the (noiseless) useful signal verifies a Lipschitz-type smoothing condition ($|\dot{y}_0(k)-\dot{y}_0(k-1)| \leq L\Delta t$, with a Lipschitz constant of L>0. The differentiator of order 1 is thus described by:

$$\begin{cases} \dot{z}_0 = -\alpha_0|z_0 - y|^{1/2}\text{sign}(z_0 - y) + z_1 \\ \dot{z}_1 = -\alpha_1\text{sign}(z_1 - \dot{z}_0) = -\alpha_1\text{sign}(z_0 - y) \end{cases}$$

where $z_0$ represents the estimate of the input signal y and $z_1$ is the estimate of the $1^{st}$ derivative.

The coefficients $\alpha_0$ and $\alpha_1$ are positive gains which ensure convergence of the algorithm in finite time. They depend on the Lipschitz constant L. With n=1, the coefficients $\alpha_0=1.5 L^{1/2}$ and $\alpha_1=1.1 L$ are obtained.

The device 1 is advantageous since it offers low computing complexity of an equivalent level to a second order filter. In addition, a single adjustment parameter L is required for sound operation of the algorithm. Indeed, the other internal parameters of the differentiator are deduced on the basis of the value of L.

The Lipschitz constant L is adjusted so as to ensure a compromise between the degree of precision and smoothness of estimation. It should be noted that a high value for the Lipschitz constant makes it possible to ensure rapid convergence and to derive a signal which scans over a large band of frequencies. In return, a considerable gain leads to amplification of the noise in the estimated signals. The differentiator becomes less precise and more sensitive to noise. The ideal scenario is to select a value of the parameter L that is relatively low, while still ensuring an acceptable convergence time. In the present invention, the parameter is adjusted so as to minimise estimation error $|z_0-y|$.

It should be noted that the Levant derivative becomes more precise the shorter the sampling period.

In the first two embodiments, the device 1 is used in a feedback control loop at the position of an aircraft control surface, in which loop the position of the actuator rod, responsible for mechanising a command issued by an onboard computer, is measured by a dedicated sensor, which acts as a measuring means 2.

In this case, the actual first order derivative verifies the Lipschitz condition. Indeed, it can be shown that acceleration of the control surface, that is to say the derivative of the derivative of its position, is limited.

Since the control surface is connected to the actuator by the actuator rod, the actual derivative of the rod position for which an estimate is sought, verifies a Lipschitz-type condition.

According to a first embodiment, the position of the actuator rod responsible for mechanising a command issued by an onboard computer is measured by a dedicated sensor. A seizure, or jamming, of this control surface is reflected in a sensor measurement that is set at a constant value. A derivative computation, associated with a complementary logic, makes it possible to show this jamming, since the derivative of a constant is zero.

In this first embodiment, shown in FIG. 2, jamming of the aircraft control surface is detected by comparing the first derivatives of two correlated signals, of which one 12 represents the command of the other 13. The signal 12 is the pilot's command in the feedback control loop 5 and the signal 13 is the position measured by a sensor.

More precisely, in a feedback control loop 5 at the position of a control surface, the Levant differentiator 8, 10 of order 1 is applied to the feedback control command 12 and to the rod position 13 which is provided for example, in a preferred embodiment, by a linear variable differential transducer (or LVDT) sensor. Knowing that the rod position 13 is supposed to follow the pilot's command 12 in normal operation, jamming is detected when the position derivative has a value of approximately zero, but not the value of the command. Indeed, the control surface is set at a constant value whereas the command continues to change.

A filter 6 is applied to the pilot's command 12 in order to reproduce the dynamics of the feedback control loop. In a particular embodiment, said filter may be a filter of order 2 characterised by two gains $K_1$, $K_2$ shown by 14 in FIG. 2.

In addition, upstream of each differentiator 8, 10, a $1^{st}$ order low-pass filter 7, 9 is introduced so as to filter the high-frequency components of the two signals. This makes it possible to achieve improved performance for the derivatives of the Levant differentiator, which operates better for signals that are relatively quiet. The value of the gain $k_1$, represented by 15 and 17, of the filters 7, 9 is selected so as to be sufficiently high not to alter the pilot's command that is sent at low frequency, while suppressing the components thereof of which the spectra are within the rejection band of the filter.

The Lipschitz constant L, represented by 16 and 18, of the differentiators 8, 10 is adjusted to a relatively small value so as to ensure a sufficiently smooth derivative, but not too small, so that the derivative is precise.

Control surface jamming is confirmed at the time of decision-making 11 if, during a given confirmation period, the absolute value of the position derivative is below a threshold whereas the absolute value of the derivative of the command 12, or the average command derivative over a sliding window, is above the threshold. Adjustment of the detection threshold depends, inter alia, on the value of the parameter L. The smoother the derivative, the lower the threshold can be without the risk of non-detection for small commands from the pilot or of there being a false alarm.

In a second embodiment, the detecting device is adapted to detect an oscillatory defect in an aircraft control surface. This defect is detected by means of an approach based on a model that requires filtering of the residue in the decision-making step, in particular in order to get rid of any continuous components of the defect. The use of a derivative makes it possible to eliminate the continuous component since the cyclical nature of the defect is preserved by the derivative.

In this second embodiment, the device detects an oscillatory malfunction of an aircraft control surface by computing the derivative of the signal (i.e. the residue) affected by the malfunction. Depending on the type of oscillatory malfunction, the residue can be formed solely by the sinusoidal malfunction signal with a continuous component mixed with the modelling noise. In order to detect the malfunction, the decision-making step is based on the tally of the number of successive and alternate instances of the residue exceeding a threshold. Computing the residue derivative by means of the differentiator makes it possible to eliminate the continuous component of the defect and to bring the residue to approximately zero, within a finite convergence time.

The oscillation tally is performed at approximately zero, above a predetermined threshold, and the high convergence speed ensured by the differentiator allows for early detection of the malfunction. Depending on the frequency band of the signal and on the selected adjustment, the differentiator may also lead to amplification of the malfunction. As a result, for the same threshold and while keeping the same principle for tallying the oscillations, the malfunction will be detected earlier.

Thus, the detecting means 4 detect an oscillatory defect by tallying all successive and alternate instances of said estimated derivative exceeding a fixed threshold, when the number resulting from said tally is higher than a predetermined number.

Furthermore, an advanced version of the Levant differentiation algorithm of order 1 can be applied in order to estimate the residue derivative, in which:

$$\begin{cases} \dot{z}_0 = -\alpha|z_0 - y|^{1/2}\text{sign}(z_0 - y) + z_1 \\ \dot{z}_1 = -\beta\text{sign}(z_0 - y) = -\chi\text{sign}(z_1) - z_1 \end{cases}$$

where $\alpha$, $\beta$, $\chi$ are the adjustment parameters depending on L.

The device demonstrates resilience to non-differentiable noise of any amplitude.

According to a third embodiment, the device detects a malfunction when the derivative of one parameter is zero. Indeed, a large number of flight parameters are required to control the aircraft. In the event of a malfunction, some of these parameters may remain at set values. As in the first embodiment, derivative computation can help to detect this phenomenon.

According to a fourth embodiment, the device 1 detects a malfunction by comparing two data of parameters of coherent evolution. The malfunction is detected when the derivative of one parameter is zero while the derivative of the other parameter is not zero. For example, longitudinal movement of the aircraft causes both a variation in its angle of attack and in its load factor. Thus, variation in one parameter while the other remains set at a constant value is a sign of abnormal behaviour of the aircraft.

The invention claimed is:

1. A method for detecting a fault on an aircraft, comprising the following successive steps implemented in an automated and repeated manner:
    a) providing a control surface on the aircraft, wherein the control surface is adapted to be moved to control the aircraft;
    b) monitoring a movement parameter indicative of the movement of the control surface on the aircraft by a single sensor;
    c) outputting by the single sensor at least one noisy datum indicating the movement parameter;
    d) receiving the at least one noisy datum output by the sensor, wherein the derivative of the at least one noisy datum is established by a sliding mode differentiator;
    e) estimating a derivative of said at least one noisy datum by differentiation, on the basis of said at least one noisy datum;
    f) detecting a fault on the basis of at least the estimated derivative, and
    g) declaring the fault as a failure of the control surface in conjunction with monitoring performance of the aircraft.

2. The method according to claim 1, wherein, said at least one noisy datum is in the form $y(k)=y_0(k)+\varepsilon(k)$, where $y_0(k)$ is an useful datum and $\varepsilon(k)$ is noise at the time k, the derivative of rank n of said useful datum $y_0(k)$ verifying a Lipschitz-type smoothing condition:
$|y_0^{(n)}(k) - y_0^{(n)}(k-1)| \leq L\Delta t$, where L is a constant, said method consisting in eliminating the components of said at least one noisy datum y(k) of which the rate of variation in the derivative of rank n is greater than L.

3. The method according to claim 2, wherein said sliding mode differentiator is a Levant differentiator of order n said Levant differentiator being in the form:

$$\begin{cases} \dot{z}_0 = -\alpha_0|z_0 - y|^{n/(n+1)}\text{sign}(z_0 - y) + z_1 \\ \dot{z}_1 = -\alpha_1|z_1 - \dot{z}_0|^{(n-1)/n}\text{sign}(z_1 - \dot{z}_0) + z_2 \\ \ldots \\ \dot{z}_i = -\alpha_i|z_i - \dot{z}_{i-1}|^{(n-i)/(n-i+1)}\text{sign}(z_i - \dot{z}_{i-1}) + z_{i+1} \\ \ldots \\ \dot{z}_n = -\alpha_n\text{sign}(z_n - \dot{z}_{n-1}) \end{cases}$$

where $z_0, z_1 \ldots z_n$ represent estimates of a signal and of its successive n derivatives respectively, and coefficients $\alpha_i$ are positive gains representing adjustment parameters.

4. The method according to claim 3, wherein said sliding mode differentiator is a Levant differentiator of order 1, the Levant differentiator having the following form:

$$\begin{cases} \dot{z}_0 = -\alpha_0|z_0 - y|^{1/2}\text{sign}(z_0 - y) + z_1 \\ \dot{z}_1 = -\alpha_1\text{sign}(z_1 - \dot{z}_0) = -\alpha_1\text{sign}(z_0 - y) \end{cases}.$$

5. The method according to claim 4, wherein a value of L is selected so as to minimize estimation error $|z_0-y|$.

6. The method according to claim 1 further comprising determining a derivative of a control signal form a control signal applied to move the control surface and comparing the derivative of the control signal to the estimated derivative, wherein the detection of the fault is based on the comparison.

7. The method according to claim 1, wherein the single sensor is a control surface movement sensor.

8. The method according to claim 1 further comprising repeatedly performing steps b) to e) to generate a sequence of estimated derivatives, and the detection of the fault includes a determination of whether a number of the estimated derivatives exceeds a predetermined number.

9. The method according to claim 8, the estimation of the derivative includes using a Levant differentiator of order 1, in which:

$$\begin{cases} \dot{z}_0 = -\alpha|z_0 - y|^{1/2}\text{sign}(z_0 - y) + z_1 \\ \dot{z}_1 = -\beta\text{sign}(z_0 - y) = -\chi\text{sign}(z_1) - z_1 \end{cases};$$

where $\alpha, \beta, \chi$ are adjustment parameters depending on L.

10. The method according to claim 1, wherein the detection of the fault is based on a determination that the estimated derivative is zero.

11. The method according to claim 1, further comprising determining a derivative of a control signal applied to move the control surface and wherein the detection of the fault includes a determination that one of the derivative of the control signal and the estimated derivative is zero while the other is not zero.

12. An aircraft comprising:
a control surface configured to move in response to a pilot command;
a single control surface movement sensor configured to monitor movements of the control surface and transmit at least one noisy datum indicative of movement of the control surface;
device for detecting a fault of the control surface on an aircraft in connection with monitoring performance of the aircraft, wherein the device comprises:
a computing unit adapted to estimate at least one derivative of said at least one noisy datum, wherein, the derivative of said at least one noisy datum is estimated by a sliding mode differentiator; and
a detector adapted to detect the fault on the basis of said derivative and declare the fault to be a failure of the control surface.

* * * * *